Patented Sept. 16, 1952

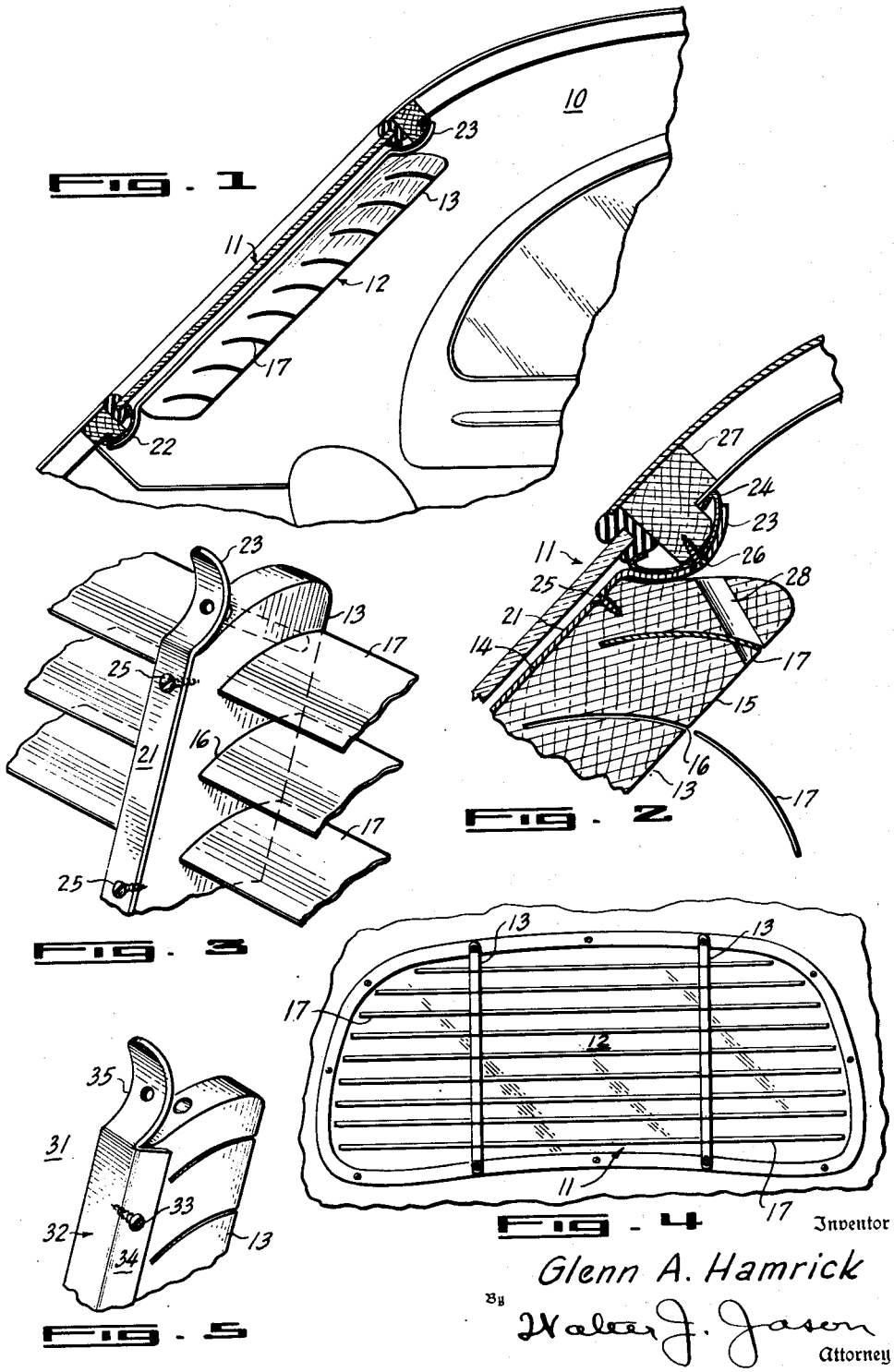

2,610,712

UNITED STATES PATENT OFFICE 2,610,712

WINDOW BLIND ASSEMBLY FOR VEHICLES

Glenn A. Hamrick, San Diego, Calif.

Application June 19, 1948, Serial No. 34,065

3 Claims. (Cl. 189—63)

This invention relates to window shades for use in vehicles and more particularly to blinds of the Venetian type adapted to be positioned upon the rear windows of automobiles.

An object of the present invention is to provide an improved form of automobile window blind which is designed to be readily secured to the framing structure of the rear window of the automobile, utilizing fastener elements thereof, and requiring no re-working or special preparation of the automobile to permit mounting.

Another object of this invention is the provision of a Venetian type blind for an automobile rear window having an improved design which effectively excludes the sun's direct rays without obstructing vision through the window, this exclusion serving to protect occupants against discomfiture and to protect the upholstery against fading and rotting.

Another object of the invention resides in providing an improved Venetian type blind for an automobile rear window having a design which allows ready access to the window to permit cleaning thereof.

A further object of the invention lies in the provision of a novel design for a Venetian type blind for automobile rear windows embodying a supporting structure for the panels which permits the ready removal and replacement thereof.

A still further object of the invention is the provision of a Venetian type blind for an automobile, which is of inexpensive construction, which is readily installed, and which is effective and efficient in operation.

Other objects and features of the present invention will be readily apparent to those skilled in the art from the following specification and appended drawings wherein is illustrated a preferred form of the invention, and in which:

Figure 1 is a view of the rear portion of an automobile accommodating a Venetian type blind according to the present invention.

Figure 2 is a fragmentary sectional view of a portion of the blind illustrating the manner of attaching the blind to the rear window of the automobile.

Figure 3 is a fragmentary perspective view of a portion of a support member utilized in the present invention.

Figure 4 is a front view of the blind as disposed within the vehicle.

Figure 5 is a fragmentary perspective view of another embodiment of a support member which may be employed to support the slats or panels.

Having more particular reference now to the drawings there is shown illustrated a portion of an automobile body indicated generally at 10, in which portion is located a window 11. The portion of the automobile illustrated is that at the rear. It is noted that this portion of the automobile is provided with a decided slope where the top converges into the back. This configuration is conventional or standard in present day automobiles. However, with this design the sun's rays more readily fall within the automobile. To obstruct the entrance of the sun's rays into the automobile through rear window 11 without interfering with vision therethrough a Venetian blind 12, constructed in accordance with the present invention, is applied to the inner face of rear window 11.

As illustrated blind 12 comprises a pair of elongated block-like support members 13 formed of wood, and maintained in spaced apart relation. The support members 13 comprise a rear side or face 14 which is disposed toward the window 11, and a front side or face 15. A plurality of vertically spaced arcuate slots 16 are provided in each member 13 along the length thereof, which slots extend transversely from the front face 15 substantially the width of the member 13 to terminate short of rear face 14. Each opposed pair of slots 16 provided by the horizontally spaced support members 13 cooperate to receive and support a louver panel or slat 17, which slats are preferably formed of metal, having some resilience, and are curved, as best shown in Figure 2, to effect an arc, in transverse cross-section. The amount of arc provided the slats 17 is different from that provided the slots 16 which accommodate the slats 17 so that when the slats 17 are manually forced into their cooperating slots the slats 17 are distorted somewhat whereby their inherent tendency to assume their normal shape provides a force which acts to maintain them securely in position; once assembled the slats 17, due to this force, will not inadvertently slip or fall from their seat in the slots. However, the slats 17 are not so tightly wedged into their slots that they cannot be readily manually removed to serve a purpose to be hereinafter described. The slats 17, with this construction, will be held in vertically spaced relation, the distance between successive slats being sufficient to allow vision therebetween, yet closely enough arranged to obstruct the rays of the sun. The number of slats utilized is dependent upon the height of the rear window 11 to be serviced. The length of the individual slats will be dependent upon the contour of the rear window, and it is understood that the invention contemplates varying the lengths to accommodate variations in shapes of windows. With arcuate slats 17 provided it is obvious that there is afforded wider obstruction areas to block the sun's rays and thereby a more effective blind is presented.

To install the pair of wooden supporting members 13 in position on the rear window 11 there is provided for each of the members 13 an elongated metallic mounting member 21 having the extremities thereof bent to provide generally semi-circular portions 22 and 23. The semi-circular portions 22 and 23 are adapted to fit upon the usual molding 24 provided to frame the window 11. The general configuration of portions 22 and 23 it is understood, should approach the configuration of the window molding so that it may readily lie thereagainst. A suitable number of screws 25 secure the mounting member 21 to the rear face 14 of its associated supporting member 13. To hold the mounting members 21 in operative position upon rear window 11 the usual mounting screws 26 employed to secure the molding 24 to the automobile body are preferably utilized. As is shown in the drawings the ends of the supporting members 13 are cut away or shaped so as to clear the molding and not interfere with the mounting of the assembly upon the window. The particular configuration assumed by the ends of members 13, it is evident, will be determined by the general contour of the rear window 11 and the location of its molding in the particular automobile utilizing the invention. It is contemplated that the supporting members 13 will be given a proper shape at their ends to permit their being mounted upon the rear window and the length of the supporting members 13 will be determined by the height of the rear window 11 being accommodated.

As shown in Figures 1 and 2 access to the lower arcuate extremities 22 of mounting elements 21 is readily had and the molding mounting screw 26 can be removed, inserted through the opening provided in arcuate portion 22 and then rethreaded into the automobile window framework 27 to secure the lower end of element 21 in position. Since the upper end of support member 13 projects over the upper arcuate portion 23 access to the screw opening therein is provided by boring a passage 28 through the support member 13. With an appropriate tool then the mounting screw 26 may be passed through passage 28 and through the aligned openings in portion 23 and molding 24 and rethreaded into the window-frame work 27 to complete the mounting of the element 21 and its associated louver panel supporting member 13 against the window 11. Of course the upper end of support members 13 could be squared off to provide ready access to the molding mounting screws but this would necessitate the omission of the uppermost louver panel to leave a gap in the shading assembly to detract from its over-all effectiveness.

The invention contemplates that whenever possible the molding mounting screws 26 provided by the automobile will be employed, but if for some reason these mounting screws 26 cannot be utilized then new openings will be threaded into the molding which will accept screws to fasten the upper and lower extremities of the mounting element 21 in place.

The Venetian blind assembly 12, herein described, comprising a plurality of horizontally extending transversely curved, vertically arranged louver panels, is adapted to effectively exclude a maximum of direct sunlight from the automobile while affording a minimum of interference with the vision of the driver through the rear window. Since the arrangement of the present invention wherein the various slats 17 are held in place in a pair of slots 16 by effecting a difference in curve degree between the louver panels 17 and their cooperating slots 16 provides for ready manual removal of the individual louver panels 17, easy access to the window 11 is afforded for washing of the window. It is not necessary that the molding mounting screws 26 be removed and the support members 13 dismounted. Of course removal of the slats 17 may be desired for reasons other than the washing of the window, the panels may require cleaning or painting, or replacing if damaged; or it may be that the rear-seat occupants may desire a view skyward or upwardly to observe objects of interest, or may even desire additional sunlight to enter the automobile.

Transverse curving of the slats 17 is provided not only to serve to hold the slats upon the supporting members 13 but also to add rigidity to the panels and further present greater obstruction areas to the sun's rays and reduce light reflection into the automobile. With the present construction there will be no annoying vibration noises since the metallic louver panels are supported and held by support members made of wood.

The elongated mounting member 21 may be given a decorative finish such as chrome-plating so as to provide a pleasing appearance as it is viewed from the exterior.

In the second embodiment of the invention illustrated in Figure 5 the only distinction over the first arrangement of a window blind described above lies in the metallic mounting strips which hold the support members 13 to the window. The mounting strip, shown generally at 31, utilized by the second embodiment comprises a channel shaped portion 32 which is adapted to fit over face 14 of the support block 13 and to embrace a portion of the side walls of the block. Mounting screws 33 in suitable number are passed through the opposite side walls 34 of the channel 32 and are threaded into the wooden support member 13 to secure the mounting strip 31 thereto. To hold the mounting strip 31 to the window frame there is provided, as in the mounting strip 21 of the first embodiment, generally arcuate portions 35 (only one being shown), at the extremities of and extending from the channel portion 32. These arcuate portions will be fitted upon the molding and secured thereon by the usual molding mounting screws. The remainder of the Venetian blind construction for this second embodiment is similar to that of the first embodiment and is used in the same manner.

While certain preferred embodiments of the invention have been specifically disclosed, it is understood that the invention is not limited thereto as many variations will be readily apparent to those skilled in the art and the invention is to be given its broadest possible interpretation within the terms of the following claims.

I claim:

1. A window shade assembly adapted to be mounted upon the rear window of an automobile comprising a pair of spaced apart elongated support members, said support members having a plurality of generally arcuate slots provided therein and longitudinally spaced therealong, a plurality of transversely curved unitary slats formed of a resilient material fitted in said spaced slots and readily removably supported thereby upon said support members, said spaced slots positioning said slats vertically one above the other to exclude the direct rays of the sun without obstructing vision through the rear window, the curvature of said arcuate slats being different than the curvature of said curved slats whereby said slats will be distorted on insertion into said slots to provide a holding force which maintains said slats in position, and means to secure said support members to the frame of the rear window, said means comprising an elongated metallic mounting strip secured on each of said support members at their rear faces, said strips adapted to be secured at their extremities to the rear window frame.

2. A window shade assembly adapted to be mounted upon the rear window of an automobile comprising a pair of spaced apart elongated support members, said support members having a plurality of generally arcuate slots provided therein and longitudinally spaced therealong with said arcuate slots opening into a face of said support members and curving inwardly and downwardly from said face, a plurality of transversely curved slats formed of a resilient material fitted in said spaced slots and readily removably supported thereby upon said support members and positioned vertically spaced one above the other to afford vision through the window, the curvature of said arcuate slots being different than the curvature of said curved slats whereby said slats will be distorted on insertion into said slots to provide a holding force which maintains said slats in position, and means to secure said support members to the frame of the rear window, said means comprising an elongated mounting strip secured to each of said support members and having generally arcuate portions provided at each of its extremities, which arcuate portions are adapted to be secured by fasteners to the rear window frame.

3. A window shade assembly adapted to be mounted upon the rear window of an automobile comprising a pair of spaced apart elongated support members, said support members having a plurality of generally arcuate, downwardly extending slots provided therein and longitudinally spaced therealong, a plurality of transversely curved slats formed of a resilient material fitted in said spaced slots and readily removably supported thereby upon said support members, said spaced slots positioning said slats vertically one above the other to afford vision through the window, the curvature of said arcuate slots being different than the curvature of said curved slats whereby said slats will be distorted on insertion into said slots to provide a holding force which maintains said slats in position, and means to secure said support members to the frame of the rear window, said means comprising a mounting member secured to each support member, said mounting members having a channel shaped portion adapted to fit upon and embrace the support member and generally arcuate portions extending from each end of said channel shaped portion, which arcuate portions are adapted to be secured by fasteners to the rear window frame.

GLENN A. HAMRICK.

REFERENCES CITED

The following references are of record in the file of this patent:

UNITED STATES PATENTS

| Number | Name | Date |
| --- | --- | --- |
| 881,433 | Mitchell | Mar. 10, 1908 |
| 2,210,624 | Kramer | Aug. 6, 1940 |
| 2,349,470 | Stanfield | May 23, 1944 |
| 2,355,847 | Burns | Aug. 15, 1944 |
| 2,485,263 | Digby | Oct. 18, 1949 |